(12) United States Patent
Xia et al.

(10) Patent No.: US 8,611,752 B2
(45) Date of Patent: Dec. 17, 2013

(54) METHOD AND SYSTEM FOR OPTICAL COMMUNICATION

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 362 days.

(21) Appl. No.: 13/036,260

(22) Filed: Feb. 28, 2011

(65) Prior Publication Data

US 2012/0219299 A1 Aug. 30, 2012

(51) Int. Cl.
*H04B 10/00* (2013.01)

(52) U.S. Cl.
USPC .............................. 398/105; 398/126; 398/175

(58) Field of Classification Search
USPC .................................. 398/104–105, 126, 175
See application file for complete search history.

(56) References Cited

U.S. PATENT DOCUMENTS

| | | | | |
|---|---|---|---|---|
| 4,836,641 A | * | 6/1989 | Priaroggia | 385/100 |
| 5,737,105 A | * | 4/1998 | Ohta et al. | 398/18 |
| 6,208,784 B1 | * | 3/2001 | Glen et al. | 385/48 |
| 6,711,704 B1 | * | 3/2004 | Tezuka | 714/712 |
| 8,134,890 B2 | * | 3/2012 | Rhodes et al. | 367/131 |
| 2009/0015262 A1 | * | 1/2009 | Strack et al. | 324/348 |

* cited by examiner

*Primary Examiner* — Dzung Tran

(57) ABSTRACT

An optical transmission system is described. The transmission system comprises a plurality of modules that include signal repeaters at each end. Within each module, optical signals are propagated between the repeaters through free space. Adjacent modules are connected by optical fibers to enable optical transmission therebetween. Adjacent modules are mechanically coupled with a flexible joint.

20 Claims, 11 Drawing Sheets

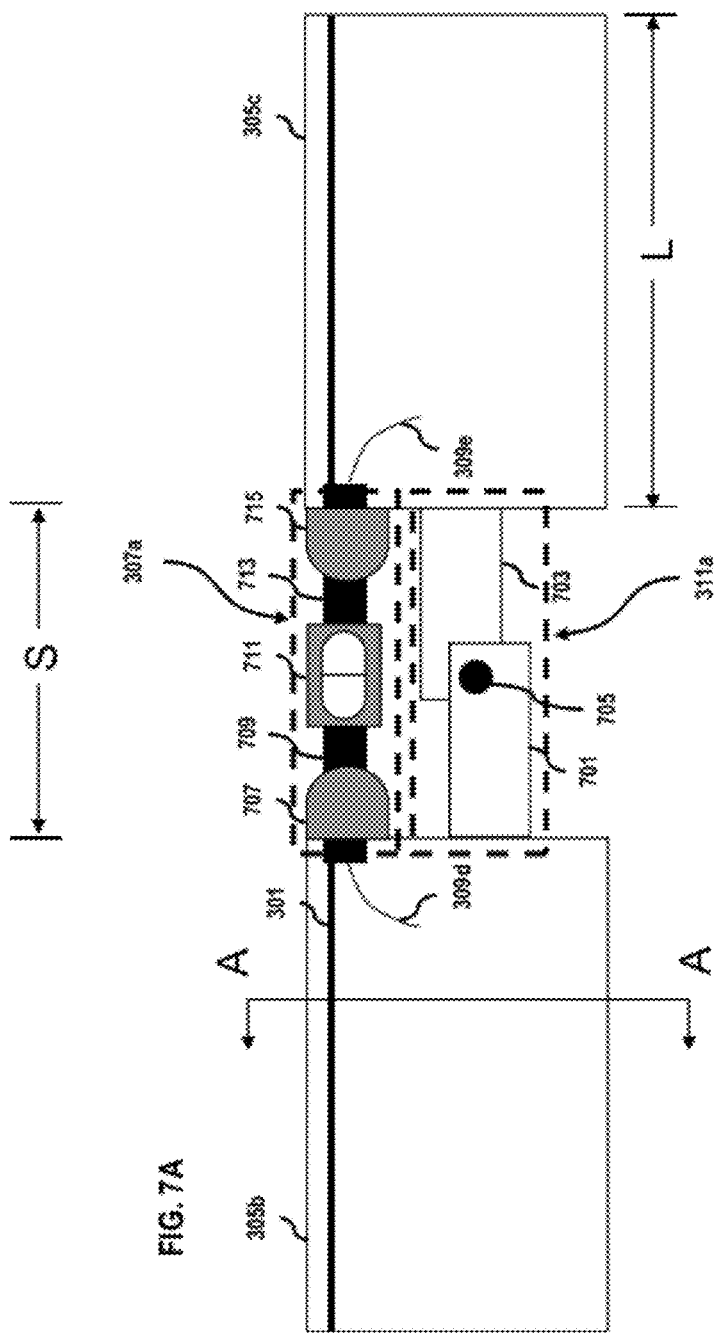
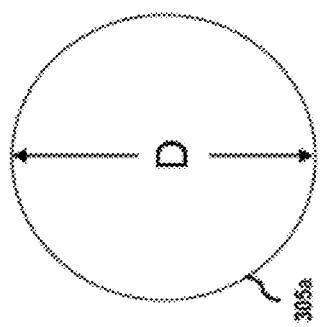
FIG. 7A
FIG. 7B

METHOD AND SYSTEM FOR OPTICAL COMMUNICATION

BACKGROUND INFORMATION

Due to their high bandwidth capacity and fast transmission speed, optical networks form an increasingly important part of the modern communication infrastructure. Most optical networks employ fiber optics to transmit light over relatively long distances. Although optical communications are relatively fast, there is still a strong demand to decrease transmission latency. A common approach for attempting to achieve this goal is to simply add additional optical fibers that are as short as possible. Therefore, there is a great need for an approach that provides still faster optical communication than optical fibers.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 7A is a schematic of the mechanical, electrical and optical connections between adjacent optical modules, according to an exemplary embodiment;

FIG. 7B is a schematic that shows a cross section of an optical module, according to an exemplary embodiment;

DESCRIPTION OF THE PREFERRED EMBODIMENT

A preferred apparatus and method for providing optical communication links is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to certain types of communication devices, it is contemplated that various exemplary embodiments are also applicable to remotely configuring other devices, entities, facilities, systems, etc.

Figure 1A:
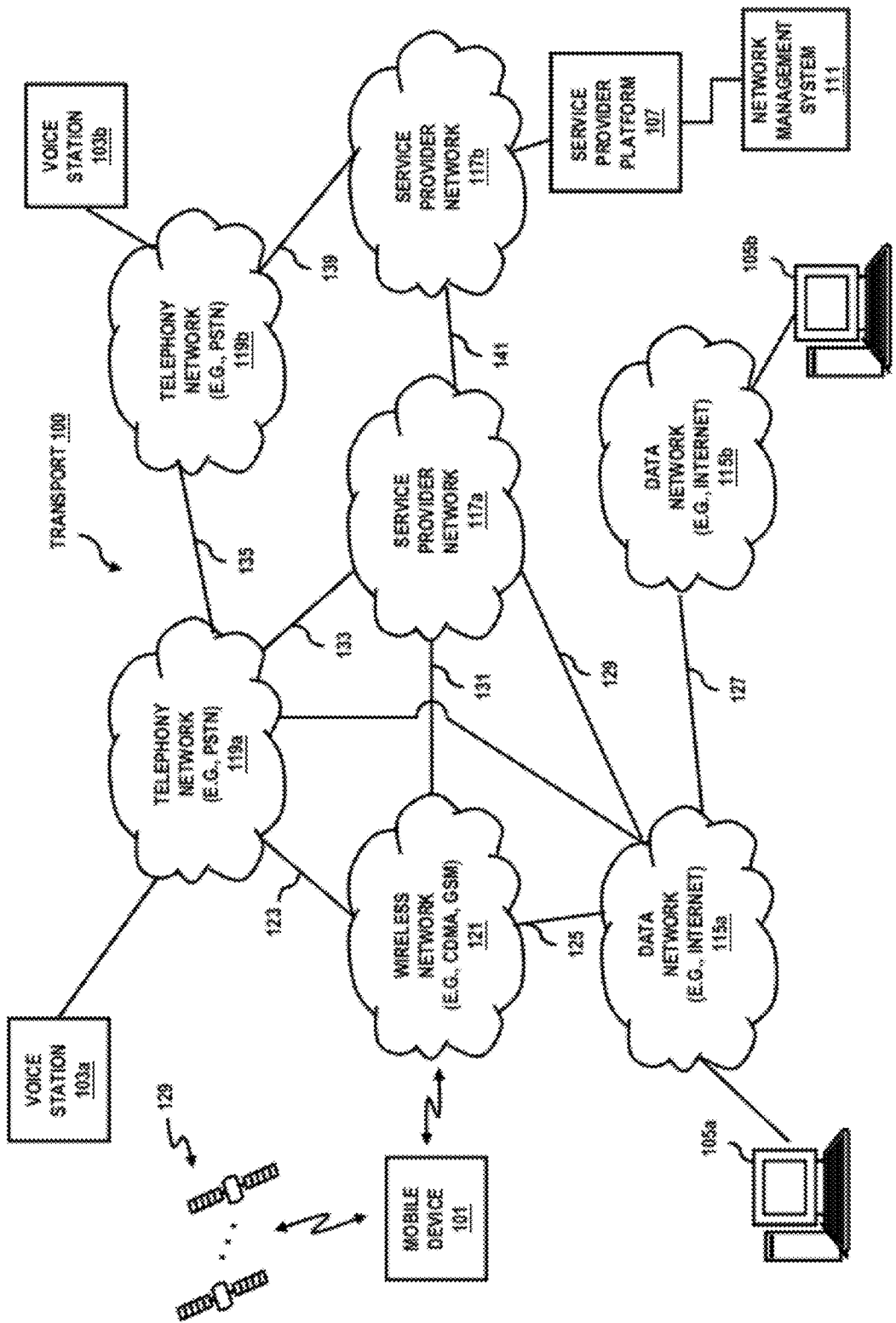
FIGS. 1A and 1B are, respectively, a diagram of a transport system utilizing transmission modules, and a flowchart of a process for transmitting an optical signal over free-space, according to various exemplary embodiments.

FIG. 1A is a diagram of a transport system utilizing transmission modules, according to an exemplary embodiment. For the purposes of illustration, a transport network 100 can be controlled by one or more service providers to permit communications devices including mobile device 101, voice stations 103a and 103b, and computer devices 105a and 105b, to communicate with one another over a multitude of networks, including data networks 115a and 115b, wireless network 121, service provider networks 117a and 117b, and telephony networks 119a and 119b. Also, the service provider networks 117a and 117b enable communication devices 101, 103a and 103b, and 105a and 105b, to access various features and functions provided by a service provider platform 107, which is connected to the service provider network 117b. In one embodiment, the service provider platform 107 can include various operational systems (e.g., network management system 111 for providing network fault detection and recovery) as well as systems for providing, e.g., telecommunication services to subscribers (customers). As such, the service provider networks 117a, 117b can supply a transport network to permit connectivity among the telephony networks 119a and 119b, data networks 115a and 115b, and/or wireless network 121.

Network management system 111 can monitor the transport network to detect faults stemming from the physical wiring and/or equipment and to initiate the appropriate restoration or recovery procedures. Monitoring may be performed over any suitable time interval, which may be predefined and/or configured by, for example, a network administrator. For instance, a configurable time interval may be established for monitoring network traffic over several seconds, minutes, hours, days, etc. Also, the monitoring process can be event-based or initiated on-demand.

The transport network can include an optical network to support the communication links 123, 125, 127, 129, 131, 133, 135, 139 and 141. The optical network can utilize optical switches that are implemented using different technologies: microelectromechanical systems (MEMS), piezoelectric, nonlinear methods, thermal method, liquid crystals, with or without mirrors, lenses, and/or collimators, mechanical means, electro-optic effects, magneto-optic effects, etc. According to certain embodiments, the transport network can employ a long distance optical communication system, as detailed in FIG. 2, to support the exchange of optical signals over large distances. The long distance optical communication system can include segments that are underwater; and if the communications extends from one continent to the next, undersea. In addition to the environmental challenges, such long distance systems encounter transmission latency issues. Because of the vast distances involved, for example, with respect to trans-Atlantic transmissions, latency can negatively impact business operations of the subscribers.

Network latency can be problematic, particularly for users with time sensitive applications—e.g., business or financial transactions, on-line gaming, etc. Thus, enormous infrastructure investments have been made to build transport systems with low latency. Traditionally, these systems are implemented using fiber optic cables. Conventionally, significant efforts have been focused on reducing the fiber length— eliminating dispersion modules, obtaining short physical routes, etc. Fiber optic cables carry optical signals at speeds that fall short of that of light traveling within a vacuum.

Figure 1B:
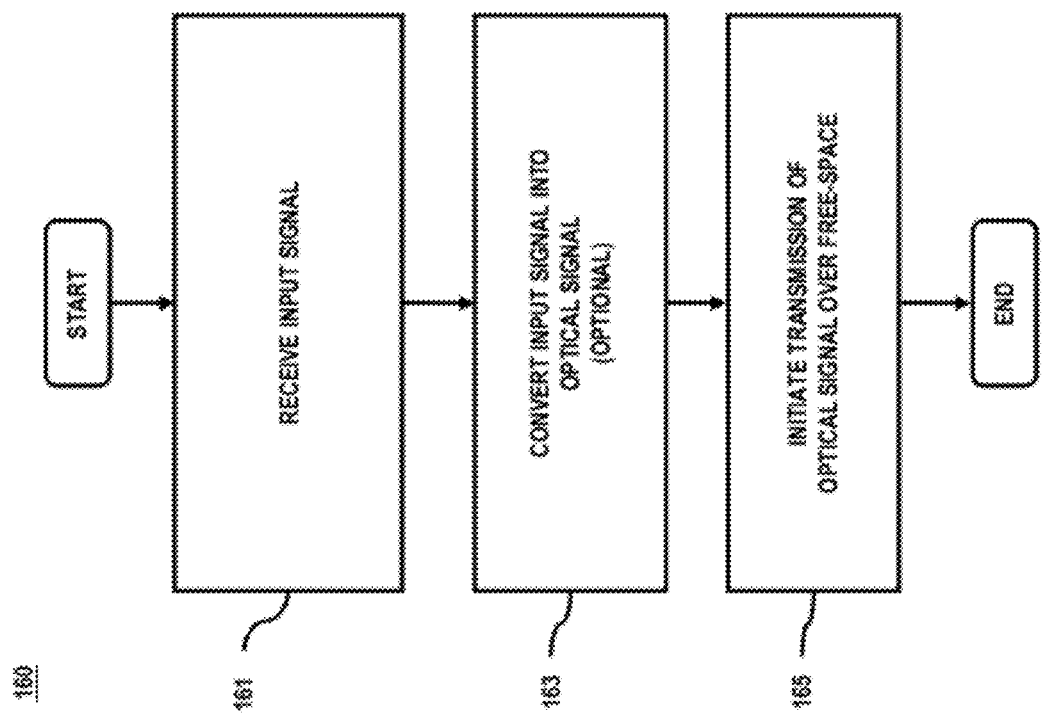

To address the issue of latency, transport system 100 utilizes transmission modules (or modular optic links) that include repeaters configured to transmit and receive optical signals over free-space (e.g., air). Free space optical systems can be used for optical communications over a distance of several kilometers, provided that is a line of sight between transmitter and receiver. The propagation of light through free-space approaches that of a vacuum, whereas transmission over a fiber optic cable is about ⅔ of the rate within a vacuum. Details of these transmission modules are provided with respect to FIG. 2. As shown in FIG. 1B, a process 160 provides for the transmission of an input signal received by a transmission module (per step 161). This input signal can be an optical signal or an electrical signal; if the input signal is an electrical signal, an electrical to optical conversion is performed by a repeater within the transmission module, as in step 163. This repeater is situated at one end of the transmission module. The converted signal (as necessary), per step 165, can then be sent over free-space within the transmission module to a repeater situated at the other end of the module. The ability to support transmission through the air or free space (e.g., without any liquid) effectively reduces latency as compared with transmission over fiber optic cables.

Referring back to FIG. 1A, by way of example, networks 115-121 may be any suitable wireline and/or wireless network. For example, telephony networks 119a and 119b may include a circuit-switched network, such as the public switched telephone network (PSTN), an integrated services digital network (ISDN), a private branch exchange (PBX), or other like network. Wireless network 121 may employ various technologies. According to one exemplary embodiment, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX) has been introduced for the provision of wireless communications on point-to-point links, as well as for full mobile access over longer distances. Other examples include Bluetooth, ultra-wideband (UWB), the IEEE 802.22 standard, etc.

Moreover, data networks 115a and 115b may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Figure 2:
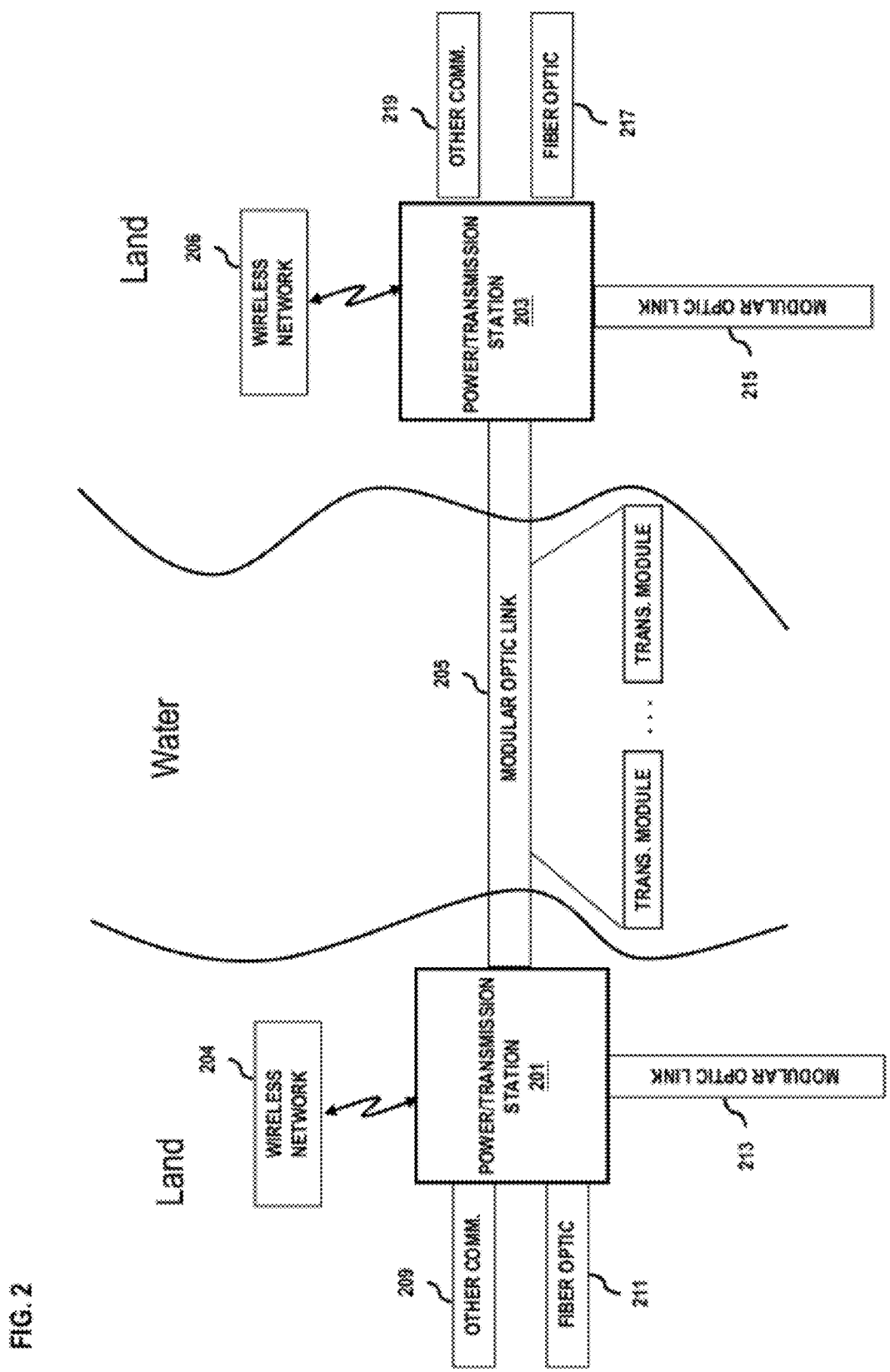
FIG. 2 is a diagram of a portion of a communication system that includes undersea and terrestrial optical communication links, according to an exemplary embodiment.

FIG. 2 is a diagram of a portion of a communication system that includes undersea and terrestrial optical communication links, according to an exemplary embodiment. Power/transmission stations 201 and 203, which are on separate land masses, can be connected by a modular optic link 205, which spans a body of water in between the land masses. The modular optic link 205, in one embodiment, can include one or more transmission modules. Also, the link 205 can be deployed on the seafloor except in areas adjacent to the power/transmission stations 201 and 203. The modular optic link 205 conveys optical communications between the power/transmission stations 201 and 203, which supply the modular optic link 205 with electrical power. The power transmission stations 201 and 203 receive communications over a variety of communication media, including air (wireless communication) via wireless networks 204 and 206, respectively, modular optic links 213 and 215, respectively, fiber optics 211 and 217, respectively, and other media 209 and 219, respectively.

In one embodiment, assuming the link 205 comprises multiple transmission modules, each of the transmission modules can be designed to have a common length to facilitate transport. For example, a standard large transport vessel or ship can carry these modules in segments of about 500 m in length. Also, in one embodiment, the transmission module 205 can be constructed as a sealed round or circular tube with a diameter of about 20 cm. It is contemplated that other dimensions can be utilized, depending on the application and transport requirements. Also, the housing of the transmission module 205 can assume other shapes or configurations beyond a tubular design.

Moreover, although the above transmission module 205 is described as being deployed underwater, the module 205 can be utilized in terrestrial networks.

In addition to reducing latency, the above arrangement can effectively detect faults occurring within the transport system on module level, as next described.

Figure 3A:
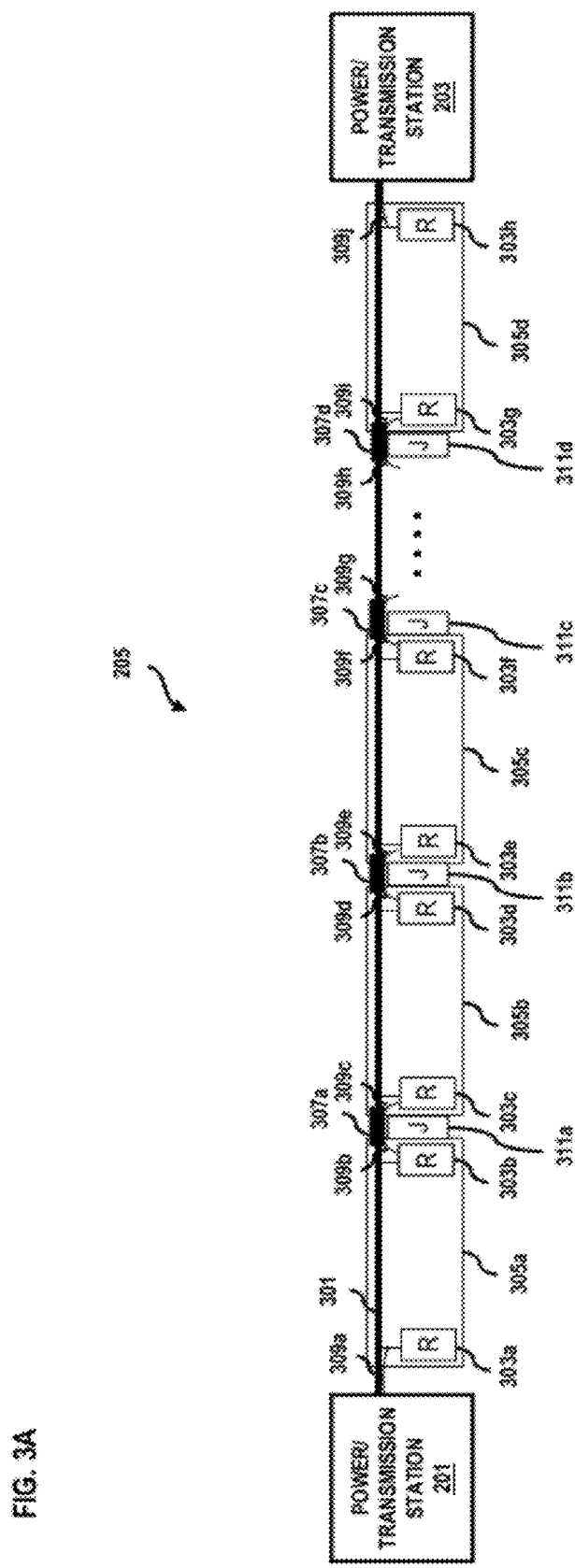
FIG. 3A is a diagram of a modular optical link and terminating power/transmission stations, according to an exemplary embodiment.

FIG. 3A is a diagram of a modular optical link and terminating power/transmission stations, according to an exemplary embodiment. FIG. 3A shows the undersea modular optical link 205 (shown in FIG. 2); but it will be appreciated that modular optical links, according to certain embodiments, may be employed in a variety of other environments, such as air and land, as indicated by the modular optic links 213 and 215 (FIG. 3). In a land based environment, the modular optical link may be deployed in a subterranean network. The modular optical communication link 205 comprises one or more transmission modules, including modules 305a, 305b, 305c and 305d, and various modules that connect modules 305c and 305d.

Under the scenario of FIG. 3A, each of the modules 305a, 305b, 305c and 305d, includes at opposite ends a pair of repeaters ("R"), 303a and 303b, 303c and 303d, 303e and 303f, and 303g and 303h, respectively. Repeaters 303b and 303c from adjacent modules 305a and 305b are connected by optical fibers 309b and 309c through an electro-optical junction 307a. Similarly, optical fibers 309h-309i connect adjacent ones of the repeaters 303 through corresponding electro-optical junctions 307b, 307c and 307d.

A power line 301 provides power to the repeaters 303a-303h. The power line 301 is connected between adjacent modules 305 through electro-optical junctions 307a-307d. The power line 301 is provided with power by the power/transmission station 201 and/or power/transmission station 203.

Adjacent pairs of modules 305a-305d are mechanically joined by one of multiple joints ("J") 311a, 311b, 311c and 311d. The joints 311a-311d, which enable adjacent ones of the modules 305 to be joined at an angle so that the modular optical link may be contoured to its environment, will be further described with reference to FIG. 7A.

Figure 3C:
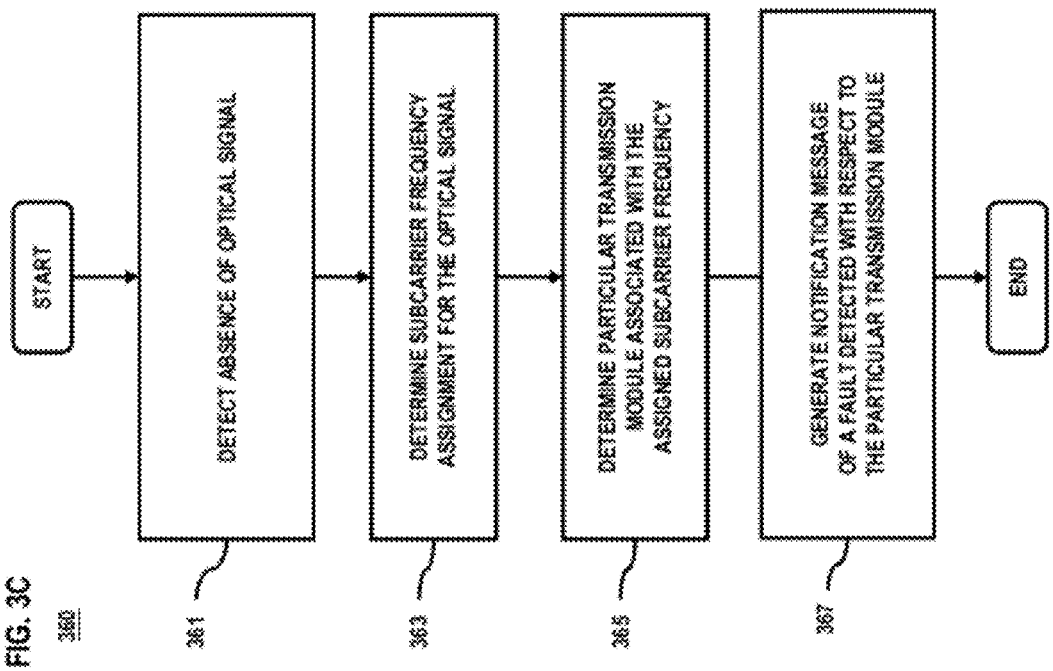
FIGS. 3B and 3C are flowcharts of processes associated with fault detection for the transmission modules of FIG. 3A, according to certain embodiments.
Figure 3B:
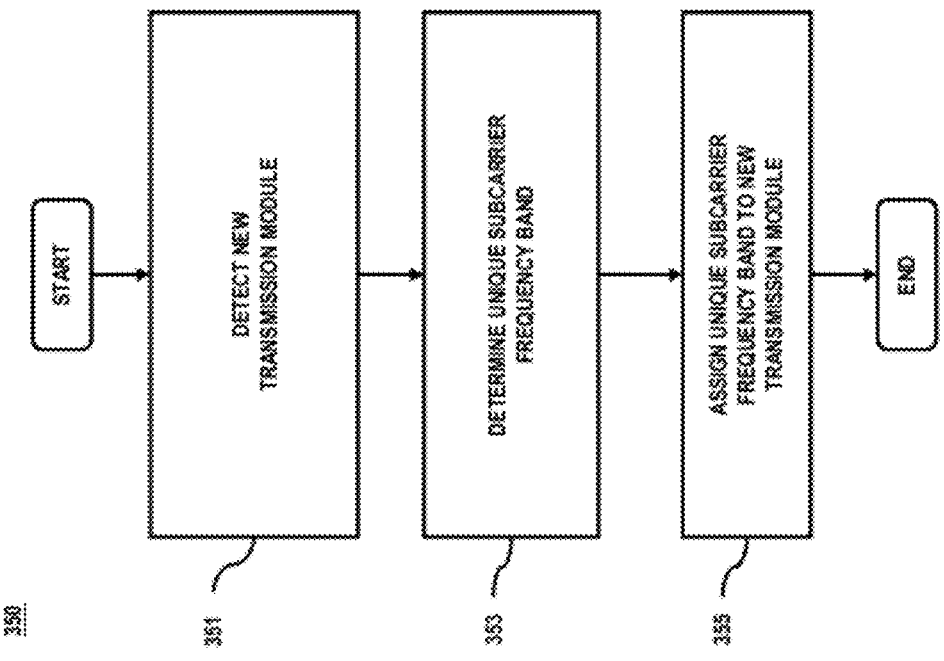

FIGS. 3B and 3C are flowcharts of processes associated with fault detection for the transmission modules of FIG. 3A, according to certain embodiments. As seen in FIG. 3B, process 350 provides for assignment of subcarrier frequencies or frequency bands that uniquely identify a transmission module. In step 351, process 350 detects or otherwise determines that a new transmission module is being deployed. Next, a unique subcarrier frequency band is determined, as in step 353. This determination can be based on scanning a list or table that provides a mapping of frequency bands to transmission modules, per step 353, for the "next" available frequency band. In step 355, the determined frequency band is then assigned to the new transmission module, per steps 353 and 355. Because of the uniqueness of the frequency bands among the transmission modules, fault detection is made more efficient in that transmission problems can be isolated down to the particular transmission module, as illustrated in FIG. 3C.

As shown in FIG. 3C, process 360 detects, for example, absence of a particular optical signal, as in step 361. In step 363, a determination is made regarding which subcarrier frequency band is involved with the particular optical signal; that is, the frequency band assignment table or list can be examined. In this manner, the mapping or assignment reveals the particular transmission module corresponding to the absent optical signal. Consequently, the faulty transmission module can be determined, as in step 365. This determination, in one embodiment, is made by the network management system 111 (of FIG. 1A), which can then generate a notification message specifying a detected fault associated with the particular transmission module.

Referring back to FIG. 3A, in operation, optical signal propagates bi-directionally through air between two of the repeaters 303 within a module 305, and optical fibers 309 convey optical signal between adjacent modules 305 or between the power/transmission stations 201 and 203 and the terminating modules 305a and 305d, respectively. In this manner, optical signals are conveyed bi-directionally between the power/transmission stations 201 and 203.

As will be further described with reference to FIGS. 3A and 4, in an exemplary embodiment, the repeaters 303 convert light signals to electrical signals, perform error correction and signal regeneration in the electrical domain, and then convert the electrical signals back to light for either "free space" (e.g., without any liquid) communication within a module, or optical fiber communication to an adjacent module.

Figure 4:
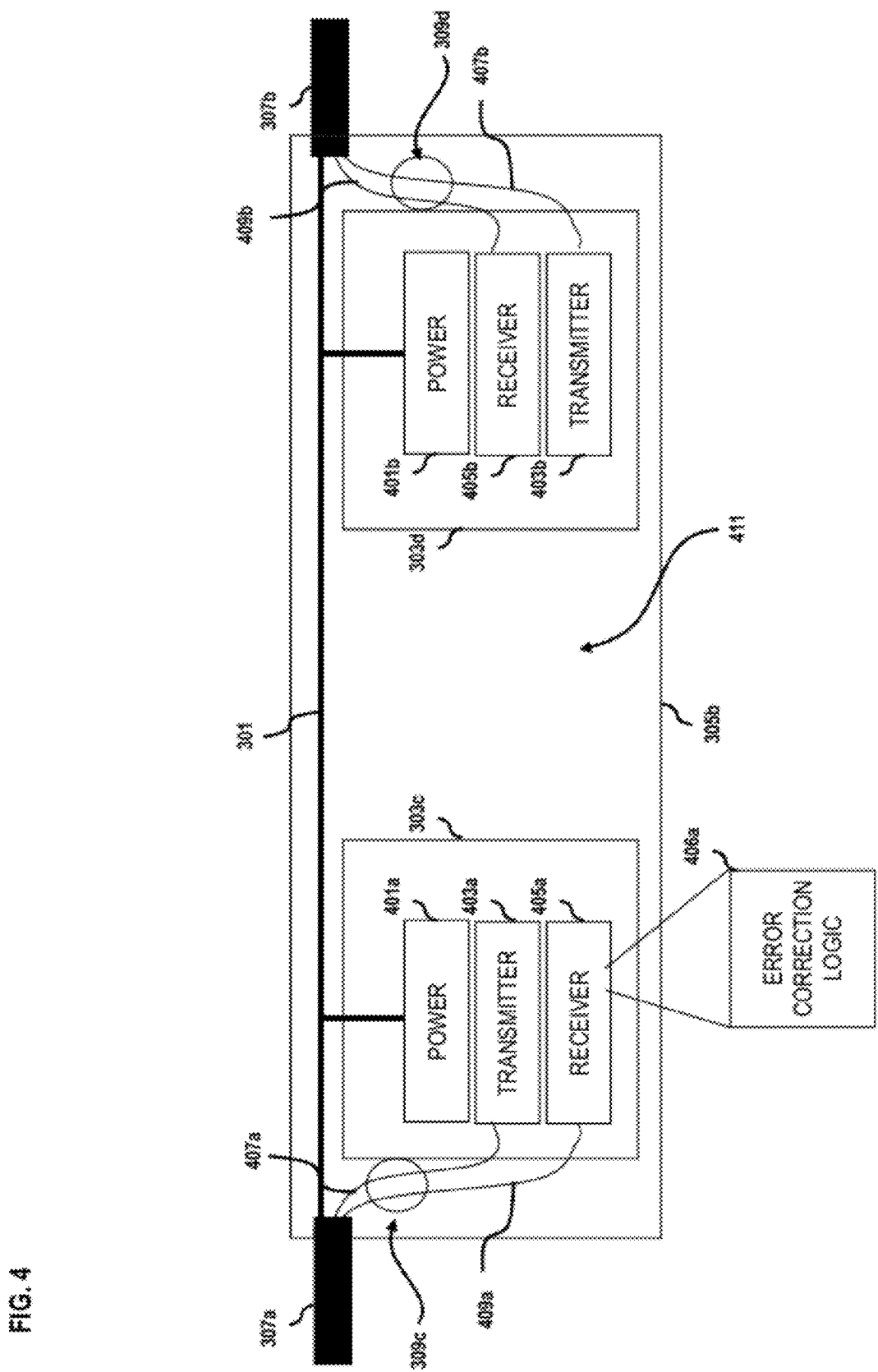
FIG. 4 is a diagram of a single optical module within a modular optical link, according to an exemplary embodiment.

FIG. 4 is a diagram of a single optical module 305b, according to an exemplary embodiment. In an exemplary embodiment, all of the modules 305 are identical to one another. The repeaters 303c and 303d (FIG. 3A) are attached to opposite ends of the module 305a. The module 305b contains a medium 411, which in one embodiment is air, through which optical signals propagate between the repeaters 303c and 303d. The repeaters can include power components 401a and 401b, transmitters 403a and 403b, and receivers 405a and 405b. In one embodiment, error correction logic can be deployed within each of the transmitters 403a, 403b or receivers 405a, 405b (of which one is shown 406a) to ensure data integrity of the transmission. The optical fibers 309c (FIG. 4) include an optical fiber 407a that connects transmitter 403a to a receiver (not shown) in adjacent module 305a. The optical fibers 309c also include an optical fiber 409a that connects receiver 405a to a transmitter (not shown) in adjacent module 305a.

The power line 301 runs between opposite ends of the module, and connects to power components 401a and 401b within the repeaters 303c and 303d, respectively. The power line connects to adjacent modules 305a and 305c through electro-optical junctions 307a and 307b, respectively.

The transmitter 403a receives optical signal signals from module 305a (FIG. 3) over optical fiber 407a, converts them to electrical signals, processes the electrical signals, converts them back to optical signals, and then transmits the optical signals through medium 411 to receiver 405b. Receiver 405b receives the optical signal, converts them to electrical signals, processes the electrical signals, converts the electrical signals back to optical signals, and conveys these optical signals over optical fiber 409b to module 305c (FIG. 3). Similarly, optical signal signals travel in the opposite direction through transmitter 403b, receiver 405a, and optical fibers 407b and 409a. In alternative embodiments, the transmitters 403 and/or receivers 405 comprise optical amplifiers that need not perform electro-optical conversion.

FIG. 5A is a diagram of the transmitter 403a, according to an exemplary embodiment. The transmitter 403a can include a variety of cascaded components, 501-513, that process an optical signal received over optical fiber 407a and transmit the resulting processed signal through the medium 411 (FIG. 4). The cascaded components include, for example, a wavelength division multiplexing (WDM) demultiplex unit 501, a detector array 503, an error correction unit 507, a driver array 509, a laser array 511, and a WDM multiplex unit 513. The WDM demultiplex unit 501 is coupled to the detector array 503 by one or more optical fibers 517. The detector array 517 is coupled to the error correction unit 507 over electrical lines 519, the error correction unit 507 is coupled to the driver array 509 over electrical lines 521; and the driver array 509 is coupled to the laser array 511 over electrical lines 523.

The WDM demultiplex unit 501 splits the optical carrier signal received over optical fiber 407a into various wavelengths. Each of the resulting optical signal signals is provided to the detector array 503 over a corresponding one of the optical fibers 517. The detector array 517 comprises one or more photodetectors and other circuitry for converting optical signals to electrical equivalents. Each of the electrical signals generated by detector array 503 is provided to the error correction unit 507 over a corresponding one of the electrical lines 519.

The error correction unit 521 applies forward error correction coding separately to each of these electrical signals. Many types of forward correction codes exist. More complex codes allow a receiver to correct a relatively larger number of transmission errors, at the cost of relatively higher bandwidth. Since the number of transmission errors is a function of the length over which transmission occurs, the complexity of the error correction code is likewise a function of this transmission length.

The driver array 509 employs multiple driver units, while the laser array 511 comprises multiple lasers. The driver units in the driver array 509 are coupled to a corresponding group of lasers in laser array 511 such that the laser array 511 generates optical signals corresponding to the error coded electrical signals that are input to the driver array 509. The driver array 509 also employs subcarrier modulation circuitry, as will be further described with reference to FIG. 6, for modulating the optical signals with a subcarrier frequency that is unique to the module 305*b*, according to one embodiment. As mentioned, it is contemplated that each of the transmission modules 305*a*-305*d* is associated with a unique subcarrier frequency band, thereby enabling the location of a fault to be traced to a particular one of the modules 305*a*-305*d*.

The laser array 511 is coupled to the WDM multiplexer 513 over one or more optical fibers 525. The WDM multiplexer 513 multiplexes the optical signals into a single optical signal and transmits such signals through the body of the module 305*b*.

FIG. 5B is a diagram of the receiver 405*a*, according to an exemplary embodiment. Under this scenario, the receiver 405*a* includes a number of cascaded components, 541-551, for processing an optical signal received through the body of the module 305*b* and providing the resultant processed signal to the adjacent module 305*a* (FIG. 2A) over optical fiber 409*a*. The cascaded components are an optical filter 551, a WDM demultiplex unit 549, a detector array 547, a laser array 543, and a WDM multiplex unit 541. In this example, the optical filter 551 is coupled to the WDM demultiplex unit 549 over an optical fiber 563. The WDM demultiplex unit 549 is coupled to the detector array 547 by one or more optical fibers 561. The detector array 547 couples to the driver array 545 over one or more electrical lines 559; similarly, the driver array 545 is coupled to the laser array 543 over electrical lines 557. The laser array 543 is coupled to the WDM multiplex unit 541 over optical fibers 555.

Operationally, optical signals impinge on the optical filter 551, which filters out all frequencies outside of a selected frequency band. The optical filter 551 provides the filtered optical signal to the WDM demultiplex unit 549, which splits the filtered optical signal into many different wavelengths.

Each of the optical signal signals from the WDM demultiplex unit 549 is provided to the detector array 547 over a corresponding one of the optical fibers 561. The detector array 547 includes one or more photodetectors, as well as other circuitry that provide optical to electrical conversion. The driver array 545 comprises one or more driver units; and the laser array 543 includes multiple lasers. Each of the driver units in the driver array 545 is coupled to a corresponding one of the lasers in laser array 543 such that the laser array 543 generates optical signals corresponding to electrical signals input to the driver array 545. Additionally, the driver array 545 also comprises subcarrier modulation circuitry, which modulates the optical signals with a subcarrier frequency that is unique to the module 305*b*.

The WDM multiplexer 541, which is coupled to a transmitter (not shown) of repeater 303*b* of module 305*a* (FIG. 3) by optical fiber 409*a*, multiplexes the optical signals provided by laser array 543 into a single optical signal and transmits this composite signal through optical fiber 409*a*.

Figure 5:
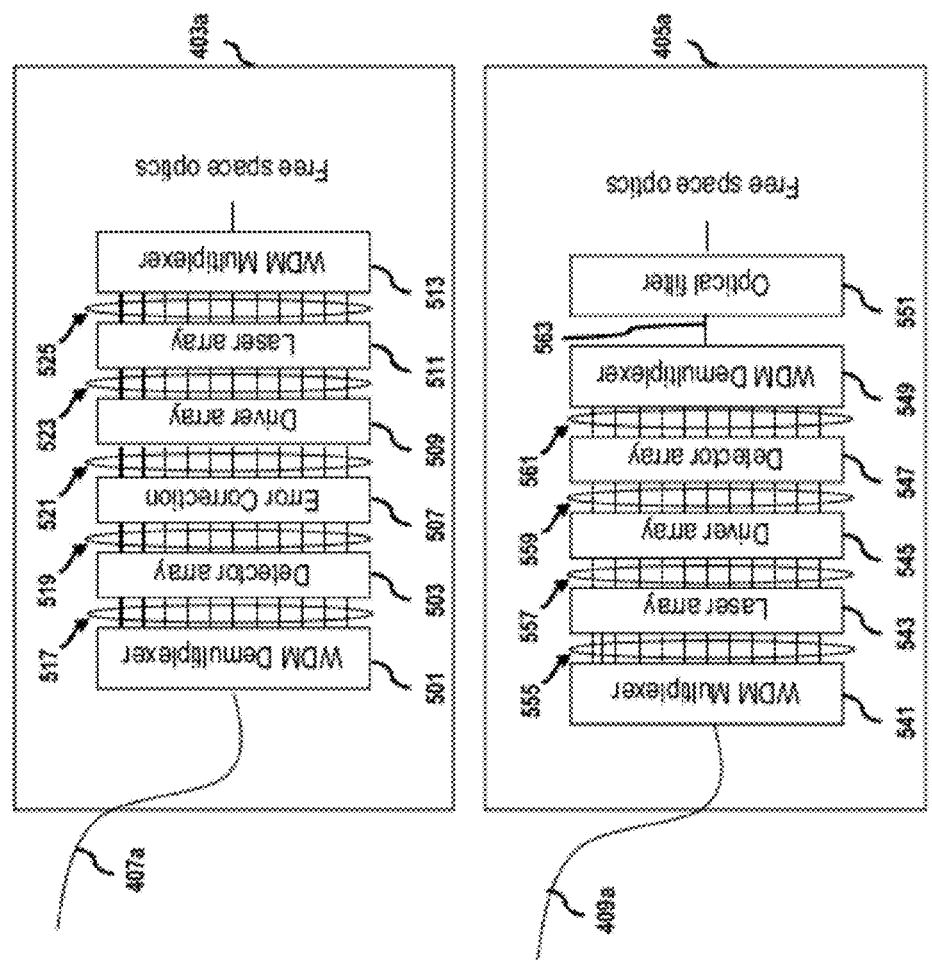
FIGS. 5A and 5B are diagrams of a transmitter and receiver, respectively, that are contained within the repeaters in an optical module, according to an exemplary embodiment.
Figure 6:
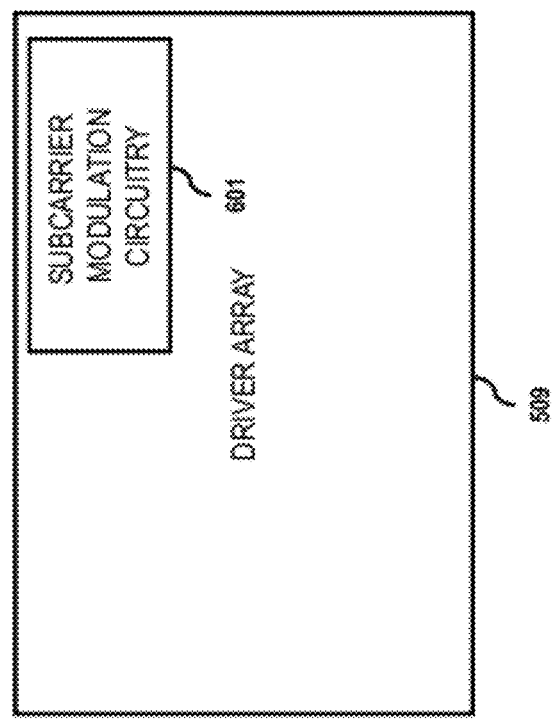
FIG. 6 is a diagram of a driver array within a repeater transmitter, according to an exemplary embodiment.

FIG. 6 is a diagram of the driver array 509 within transmitter 403*a*. The driver array comprises subcarrier modulation circuitry 601 that modulates each of the electrical signals input to driver array 509 with a unique subcarrier frequency band. That is, the module 305*b* can be uniquely identified based on the particular subcarrier (as described earlier). The modulation results in the generation of optical signals by laser array 511 (FIG. 5A) that are characterized by this subcarrier frequency band. As such, fault detection capability is enhanced, as the particular transmission module can be readily located.

FIG. 7A is a schematic of the mechanical, electrical and optical connections between adjacent optical modules 305*a* and 305*b*. The modules 305*a* and 305*b* are joined by the joint 311*a* (FIG. 3) that includes joint members 701 and 703, which extend from opposite ends of the modules 305*b* and 305*c*, respectively. In one embodiment, each of the joint members 701 and 703 includes a cavity for receiving a pin 705 that flexibly joins the members 701 and 703 such that the modules 305*a* and 305*b* may be joined at an angle. Such flexibility advantageously permits the modules 305*a* and 305*b* to adapt to the topography of the sea floor, for instance.

The electro-optical connector 307*a* comprises seals 707 and 715 that are joined to the outer walls of modules 305*a* and 305*b*, respectively. Optical fiber bundle 309*b* and power line 301 pass through cavities within the walls of modules 305*b* and 305*c* and through the seals 707 and 715. The optical fiber bundle 309*d* and power line 301 is contained within conduit 709. Similarly, the optical fiber bundle 309*e* and power line 301 are contained with the conduit 713. The conduits 709 and 713 protect the fibers/wires from the external environment (e.g. the sea). A joining seal 711 surrounds the ends of the conduits 709 and 713. The joining seal 711 enables the modules 305*b* and 305*c* to be assembled such that the optical fiber bundles 309*d* and 309*e* and power line 301 are installed separately within the modules 305*b* and 305*c* and then joined together through joining seal 711 when the modules are assembled in situ (e.g. on the sea floor).

An exemplary length L1 of the modules is approximately 500 meters. An exemplary spacing S between modules is approximately 1 meter. FIG. 7B shows a cross section taken along the plane denoted by "A" in FIG. 7A. The module 305*b* has a circular cross section with an exemplary diameter D of approximately 20 cm.

The described arrangement and processes, according to certain embodiment, advantageously reduces latency by enabling optical transmission over free-space (e.g. without any liquid).

The processes described herein relating to the control and management of the optical transmission modules may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
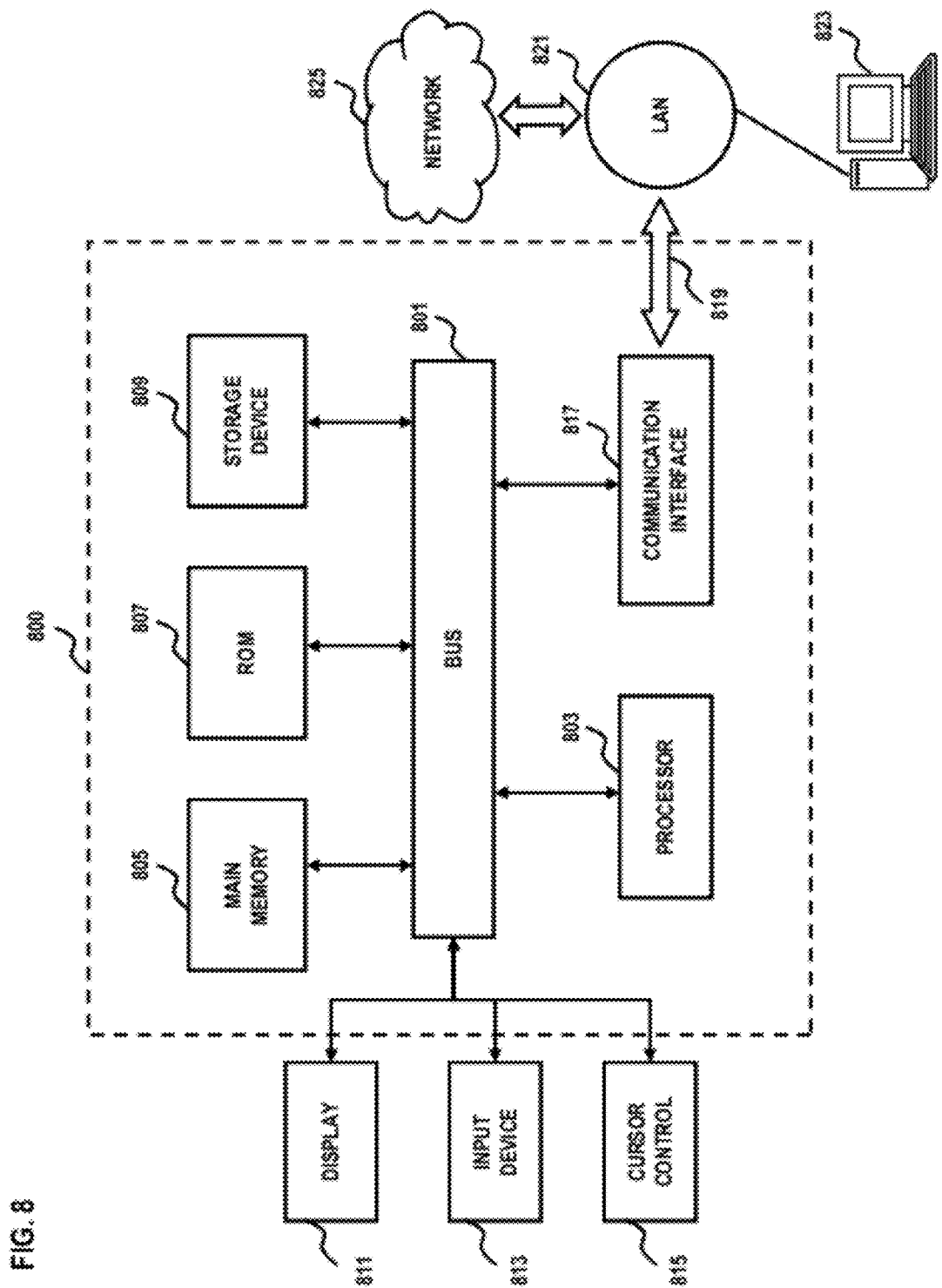
FIG. 8 is a diagram of a computer system that can be used to implement various exemplary embodiments.

FIG. 8 is a diagram of a computer system that can be used to implement various exemplary embodiments. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 5, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
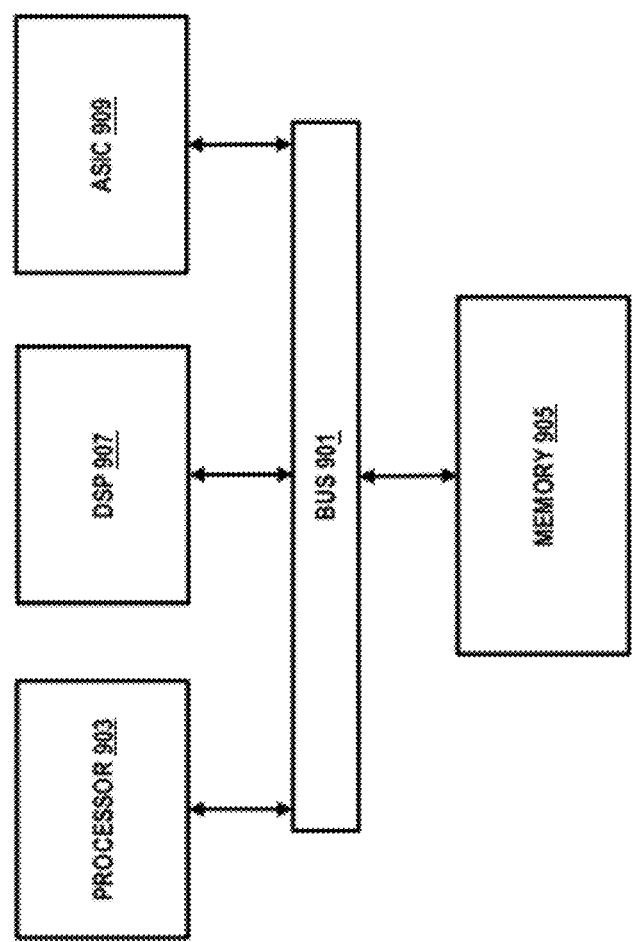
FIG. 9 is a diagram of a chip set that can be used to implement an embodiment of the invention.

FIG. 9 illustrates a chip set or chip 900 upon which an embodiment of the invention may be implemented. Chip set 900 is programmed to configure a mobile device to enable accident detection and notification functionality for use within a vehicle as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of FIGS. 1B, 3B, and 3C.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to configure a mobile device to enable accident detection and notification functionality for use within a vehicle. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A transmission apparatus comprising:
a sealed housing;
a first repeater disposed at an end of the housing and configured to process an optical signal;
a second repeater disposed at another end of the housing and configured to process the optical signal; and
a power line extending between the end and the other end of the housing and connected to each of the first repeater and the second repeater,
wherein the first repeater and the second repeater are further configured to transport the optical signal over free space within the housing.

2. An apparatus according to claim 1, wherein either one of the repeaters couples to another transmission apparatus, and at least one of the repeaters is configured to convert an electrical signal to an optical signal.

3. An apparatus according to claim 2, further comprising:
a joint member connecting the one repeater to the other transmission apparatus.

4. An apparatus according to claim 2, wherein the other transmission apparatus comprises:
a sealed housing;
a first repeater disposed at an end of the housing and configured to convert an electrical signal to an optical signal; and
a second repeater disposed at another end of the housing and configured to convert an electrical signal to an optical signal,
wherein the first repeater and the second repeater are further configured to transport an optical signal over free space within the housing.

5. An apparatus according to claim 1, wherein the transmission apparatus is configured to be part of an underwater communications network or a subterranean communications network.

6. An apparatus according to claim 1, wherein the housing is tubular in shape and contains the free space without any liquid.

7. An apparatus according to claim 1, wherein one or more of the repeaters include an error correction logic configured to provide an error correction scheme for the optical signal to be transported over free space.

8. An apparatus according to claim 1, wherein the apparatus is assigned one of a plurality of subcarriers to assist with fault detection of the apparatus.

9. A transmission system comprising:
a plurality of transmission modules configured to form a transport communications network, each of the modules including,
a sealed housing,
a first repeater disposed at an end of the housing and configured to process an optical signal,
a second repeater disposed at another end of the housing and configured to process the optical signal; and
a power line extending between the end and the other end of the housing and connected to each of the first repeater and the second repeater,
wherein the first repeater and the second repeater are further configured to transport the optical signal over free space within the housing, and
wherein the power line is connected between adjacent transmission modules.

10. A system according to claim 9, wherein the transmission modules are interconnected with joint members, and at least one of the repeaters is configured to convert an electrical signal to an optical signal.

11. A system according to claim 9, wherein the sealed housing of each of the transmission modules is waterproof and contains air as a medium to transport the optical signal.

12. A system according to claim 9, wherein each of the housings is tubular in shape and contains the free space without any liquid.

13. A system according to claim 12, wherein one or more of the repeaters include an error correction logic configured to provide an error correction scheme for the optical signal to be transported over free space.

14. A system according to claim 9, wherein the transmission modules are assigned a plurality of subcarriers, respectively, to assist with fault detection of a corresponding one of the transmission modules.

15. A method comprising:
generating an optical signal for transmission over free space within a transmission module that includes,
at least one repeater configured to convert an electrical signal into the optical signal,
wherein the repeater is contained within a sealed waterproof housing having opposing ends, and
wherein a power line extends between the opposing ends of the housing and is connected to each repeater.

16. A method according to claim 15, wherein the transmission module is configured to be part of an underwater communications network or a terrestrial communications network.

17. A method according to claim 15, wherein the housing is tubular in shape and contains the free space without any liquid.

18. A method according to claim 15, wherein the at least one repeater includes an error correction logic configured to provide an error correction scheme for the optical signal to be transported over free space.

19. A method according to claim 15, wherein the transmission module is assigned one of a plurality of subcarriers to assist with fault detection of the transmission module.

20. A method according to claim 15, further comprising:
optically or electrically coupling the transmission module to another transmission module via another repeater disposed within the housing.

* * * * *